United States Patent [19]
Brim et al.

[11] Patent Number: 6,049,832
[45] Date of Patent: *Apr. 11, 2000

[54] METHOD FOR ACCESSING INFORMATION ON A HOST COMPUTER FROM A CLIENT COMPUTER THROUGH AN INTELLIGENT VIRTUAL HOST COMPONENT

[75] Inventors: David Neal Brim, Custer; Patrick James Hammack, Bellingham; Christina Anne Haven, Bellingham; Steven Patrick Rielley, Bellingham, all of Wash.

[73] Assignee: Wall Data Incorporated, Kirkland, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/746,782

[22] Filed: Nov. 15, 1996

[51] Int. Cl.[7] .............................. G06F 13/00; G06F 15/16
[52] U.S. Cl. ......................... 709/237; 709/217; 709/228; 709/250
[58] Field of Search .................................... 709/203, 237, 709/217, 218, 219, 225, 227, 231, 228, 250; 345/121, 333, 11; 364/188

[56] References Cited

U.S. PATENT DOCUMENTS

| | | | |
|---|---|---|---|
| 4,509,122 | 4/1985 | Agnew et al. | 364/200 |
| 4,768,150 | 8/1988 | Chang et al. | 709/302 |
| 4,855,936 | 8/1989 | Casey et al. | |
| 4,864,492 | 9/1989 | Blakely-Fogel et al. | 706/45 |
| 5,179,657 | 1/1993 | Dykstal et al. | |
| 5,283,888 | 2/1994 | Dao et al. | 395/500 |
| 5,491,693 | 2/1996 | Britton et al. | 370/401 |
| 5,506,983 | 4/1996 | Atkinson et al. | 707/1 |
| 5,572,643 | 11/1996 | Judson | 709/302 |
| 5,968,119 | 10/1999 | Stedman et al. | 709/219 |

OTHER PUBLICATIONS

Lau, T., "Building a Hypermedia Information System on the Internet," *Scaling New Heights in Technical Communication*, Sep. 28–Oct. 1, 1994, pp. 192–197.

Mark Gibbs, "Absolute Beginner's Guide to Networking", 1995.

Wall Data Incorporated, "Rumba® Tools for HLLAPI-–WinHLLAPI", Version 2.0, May, 1995.

*Primary Examiner*—Frank J. Asta
*Assistant Examiner*—Jason D. Cardone
*Attorney, Agent, or Firm*—Christensen O'Connor Johnson Kindness PLLC

[57] ABSTRACT

A method and apparatus for accessing information on a host computer (104) from a client computer (112) that are connected by a network. The information accessed by the client computer (112) is represented as a plurality of fields in a presentation space data stream (208). The fields and corresponding attribute information in the presentation space data stream (208), as received from the host computer (104), are extracted and stored in field objects contained within a Display control (202). A set of events is provided by the Display control to an application program (204), the events providing information to allow the application program (204) to manage the interaction between an operator and the host computer (104). A set of properties and methods provide the application program (204) with the ability to traverse the field objects and thereby obtain the field information sent from the host computer.

18 Claims, 9 Drawing Sheets

METHOD FOR ACCESSING INFORMATION ON A HOST COMPUTER FROM A CLIENT COMPUTER THROUGH AN INTELLIGENT VIRTUAL HOST COMPONENT

FIELD OF THE INVENTION

The present invention relates to accessing of information on a host computer from a client computer, and in particular, communicating between an application program running on a client computer and a computer program running on a host computer.

BACKGROUND OF THE INVENTION

Many businesses utilize mainframe or minicomputers such as IBM mainframes, the Hewlett Packard HP3000, the IBM AS/400, and Digital Equipment Corporation VAX computers to maintain and manipulate essential information, such as accounting data. At one time, access to the programs, and therefore the data, was available only through dedicated terminals, which were connected directly to the computer or to a network on which the computers resided. However, as the use of personal computers in businesses became widespread, terminal emulation programs were developed that ran on personal computers. A terminal emulation program allows a personal computer (PC) to function as a terminal to a host mainframe or minicomputer. The PC monitor displays the information that a dedicated host terminal would display, while alphanumeric data entered with the PC is passed to the host computer in the same manner as if the data were entered with a dedicated terminal.

IBM has developed a library of application programmer interface (API) functions known as Emulator High-Level Language Application Programmer Interface (EHLLAPI), for communicating between an application running on a PC and a host application running on a mainframe or minicomputer. EHLLAPI allows programmers to develop PC applications that function as terminal emulators, thereby allowing an operator to interact with the host application program by entering commands at a PC keyboard. EHLLAPI has served as the industry-wide standard API for communicating between a host computer and a PC. Windows HLLAPI was created by a consortium of leading software manufacturers to serve as a standard EHLAPPI-style API for the Microsoft Windows® environment.

The RUMBA® connectivity software, developed by Wall Data Incorporated, is a computer program that also runs in the Microsoft Windows environment. A RUMBA program establishes a communications link with a host computer. RUMBA connectivity software allows the user of a PC to connect to a host computer in order to view stored data and to add new data. RUMBA provides a window on the PC within which an operator can access and manipulate data from a host computer. The communications link and window are referred to as a RUMBA session. The host computer creates a memory buffer containing data that is displayed on the host terminal, if such a terminal is used. The visual representation of the host memory buffer, referred to as a presentation space, is displayed within a RUMBA window, allowing an operator to manipulate the window utilizing standard Windows techniques, such as resizing or moving the window. RUMBA also provides software and an API known as RUMBA Tools For HLLAPI-WinHLLAPI which allows a Windows application to communicate with a RUMBA session. Using the RUMBA tools, a Windows application may request services from the RUMBA session, such as requesting a string displayed within the RUMBA session, or send keystrokes, commands, and strings to the host application.

A host application contains many different types of information screens, each screen including one or more fields. A field can be text or numeric information. The screens may change as a result of a request from the Windows application, forwarded by RUMBA to the host, or as a result of other events, such as an error. When a screen changes, the identity of the new screen cannot always be predicted by the Windows application. In order for an application program to communicate with the host, however, the application program must be able to correctly identify each new screen presented by the host computer. Having knowledge of the current screen, an application program can be structured to understand what each field of information contains. A method for identifying screens presented by a host computer application would assist in the development of a Windows application.

Some host computers, in particular IBM mainframes and AS/400 computers, have field-formatted screens. In a field-formatted screen, each field has a corresponding field attributes descriptor that identifies particular characteristics of the associated field. The field attributes descriptor contains information such as whether the field is protected or unprotected, the type of data (i.e., string or numeric) contained within the field, as well as other information. When an application program requests a data stream containing the data corresponding to a presentation space, each field attributes descriptor is included in the data stream immediately prior to its associated field. The application program accesses a field attributes descriptor by using a function call specifying the X, Y coordinates, in character units of the field within the host screen. In response to such a function call, the RUMBA Tools for HLLAPI-WinHLLAPI returns a binary word wherein each bit of the code word signifies a particular characteristic of the field. Using conventional programming techniques, a program must extract the particular bit for the field characteristic it is interested in. Although this technique of accessing field attributes descriptors and fields has been used extensively, an improved and simplified method of accessing fields and field attributes descriptors is desired.

Despite the successful use of EHLLAPI and its progeny, a need exists for improved methods and techniques of accessing and interacting with data residing on a host computer, in order to reduce the complexity and time of developing and maintaining application programs that are designed to interface with a remotely located computer.

SUMMARY OF THE INVENTION

The present invention is an improved method of accessing information found on a host computer with a client computer that is communicating with the host. The invention provides a Display control object that functions as a "virtual" host, by receiving information from the host computer, displaying the received information within a window on a client computer, and sending commands and information back to the host computer. The Display control provides an interface that allows an application program running on the client computer to communicate with the Display control as if the application program were communicating directly with the host computer. The interface between the Display control and the application provides a simplified object-oriented communication paradigm that reduces the complexity of writing an application program. The Display control-application interface includes events sent from the Display control to the application program to notify the application program of specified conditions or states. The Display control-application interface also includes properties of the Display control, and its child objects, containing information that the application program can access and, in some cases, modify. The Display control-application interface further includes Display control methods that can be invoked by the application program in order to maintain control of the Display control by the application program.

The Display control's events include a ReadyToSend event a KeyboardLock event, and an EndOfData event. The Display control-application interface also includes a Host-KeyPress event, an EncodeData event, an InNewField event, and an InsertModeEnabled event. The ReadyToSend event indicates whether the client computer is enabled to send data to the host computer. The ReadyToSend event includes a State parameter set to TRUE when the client computer is enabled to send data and FALSE when the client computer is not enabled to send data. The KeyboardLock event indicates whether the client computer is in a state of having the keyboard locked. The Display control sends an EndOfData event as a result of receiving a change direction indicator set to a value of 1 in an SNA request/response header.

When the Display control receives a signal indicating that a key on the keyboard has been selected, it sends a Host-KeyPress event containing a parameter that specifies the key or key combination that has been selected. For selected keys or key combinations, a mnemonic string representative of the key or key combination is included in the event. The Display control also sends an EncodeData event prior to sending data to the host computer. The Display control further sends an InNewField event when the cursor on the computer display transitions from one field to another on the computer display, and an InsertModeEnabled event indicative of whether the keyboard is in insert mode.

In accordance with another aspect of the invention, a computer-readable memory for storing data received from the host computer is provided. The memory preferably has contained within it field objects, each of which corresponds to one field of information received from the host computer. Each field object has a set of properties that include a text property, a length property, and a protected property. These properties store the text of the field, the length of the field in character units, and an indication of whether the field is read-only and cannot be changed, respectively. The memory also includes a collection object that includes a reference to all the field objects. The Display control includes a reference to the collection object. Preferably, the collection object includes program code that receives an index value corresponding to one of the field objects, and returns a reference to the desired field object in order to facilitate the retrieval of properties corresponding to a specific field and the manipulation of its properties.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As will be better understood from the following description, the present invention is directed to a system and method for accessing information that resides on a host computer.

Figure 1:
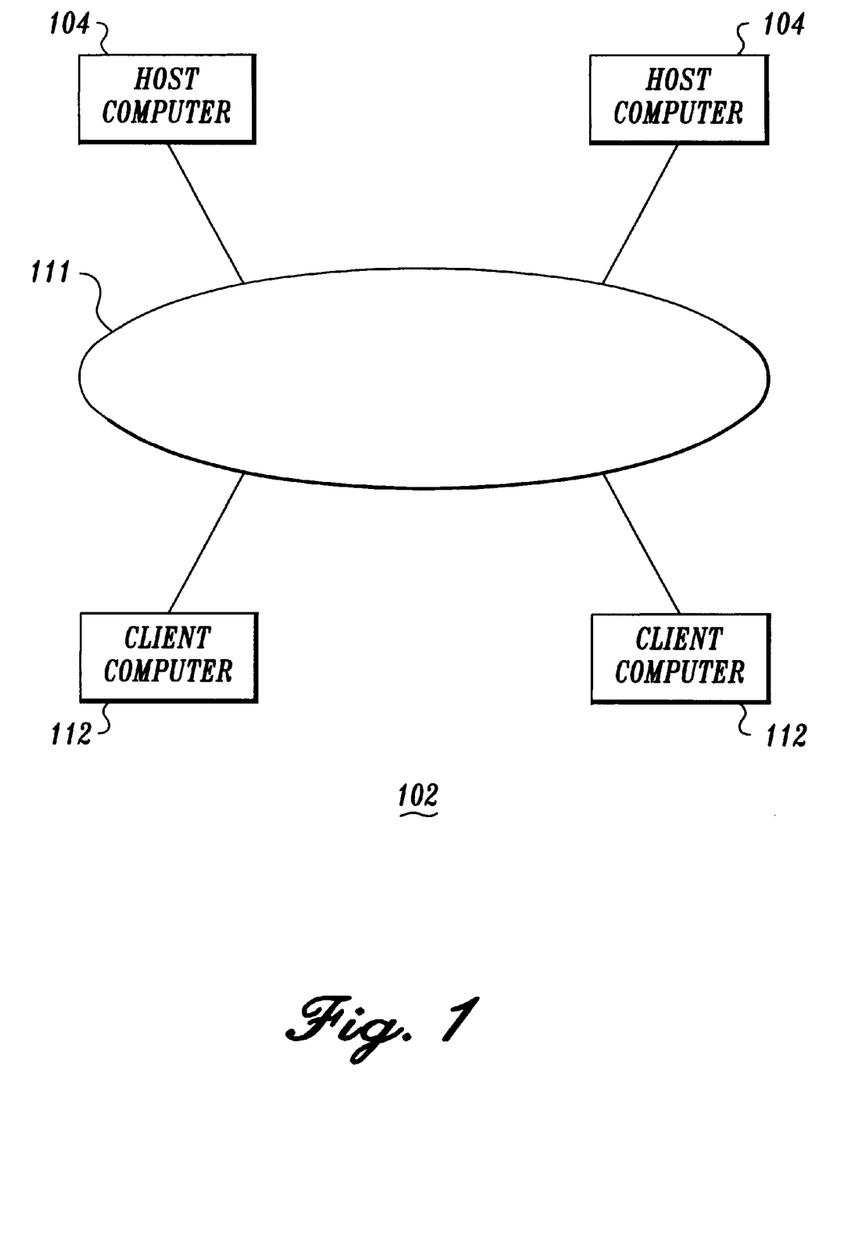
FIG. 1 is a block diagram illustrating an exemplary networking architecture in which the invention is used.

FIG. 1 illustrates an exemplary architecture 102 in which one or more client computers 112 communicate with one or more host computers 104 via a network. Each client computer is preferably an IBM or compatible personal computer of the type that includes an amount of volatile memory, and nonvolatile memory such as a hard disk or other storage device. In addition, each client computer 112 includes a processor, a keyboard, a directional input device such as a mouse, and a display device such as a cathode ray tube (CRT) or a liquid crystal display (LCD). The host computer 104 might be an IBM AS/400 computer, an IBM mainframe, an BP 3000 computer, or other similar computer that is connected to the network 111, allowing the client computer 112 to communicate by sending or receiving commands and data to any of the host computers 104. The architecture is referred to as a System Network Architecture (SNA). An SNA network may optionally employ an SNA server (not shown), which functions as an intermediary between the network 111 and each host computer 104.

The SNA utilizes a set of standards developed by IBM for network communication. The communication standards are considered to be well known to those in further detail except as they relate to the present invention.

The host computer 104 sends packets of data, referred to as data streams, across the network 111 to the client computers 112. Every data stream is preceded by header information containing flags or indicators representing network status and other information. The header information is used by nodes on the network to coordinate the exchange of data between nodes.

Figure 2:
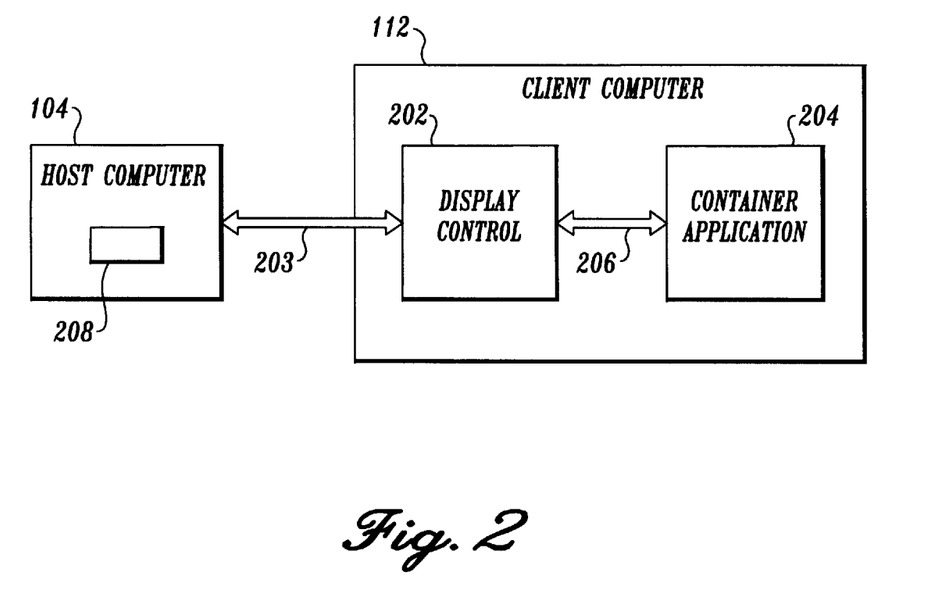
FIG. 2 is a block diagram illustrating the environmental components that interface with the invention in accordance with the present invention.

FIG. 2 illustrates an architecture in which the present invention is employed. The invention provides an object, referred to as a Display control 202 that serves as an intermediary between the host computer 104 and an application 204 that runs on the client computer 112. Data and commands are sent between the Display control and the host computer over a bidirectional datapath 203 and between the Display control and the application program 204 via the bidirectional datapath 206.

The Display control 202 therefore functions as a "virtual" host computer to the application program 204, providing an object-oriented framework and communication means, while hiding some of the communication details from the application program 204.

As depicted in FIG. 2, the Display control 202 and application program 204 reside on client computer 112. However, Display control 202 and application program 204 could each execute on different computers.

Each host computer 104 has a conceptual two-dimensional display, called a presentation space (PS), and an associated PS buffer 208. The PS buffer is a region in the computer's memory containing information that can be displayed on a computer screen. A presentation space is the conceptual display that would be created if the entire PS buffer were displayed on the computer screen. A PS buffer includes one or more fields that contain data, such as a text string or a numeric value. When a PS buffer is transmitted over the network 111, it is referred to as a PS data stream.

Figure 3:
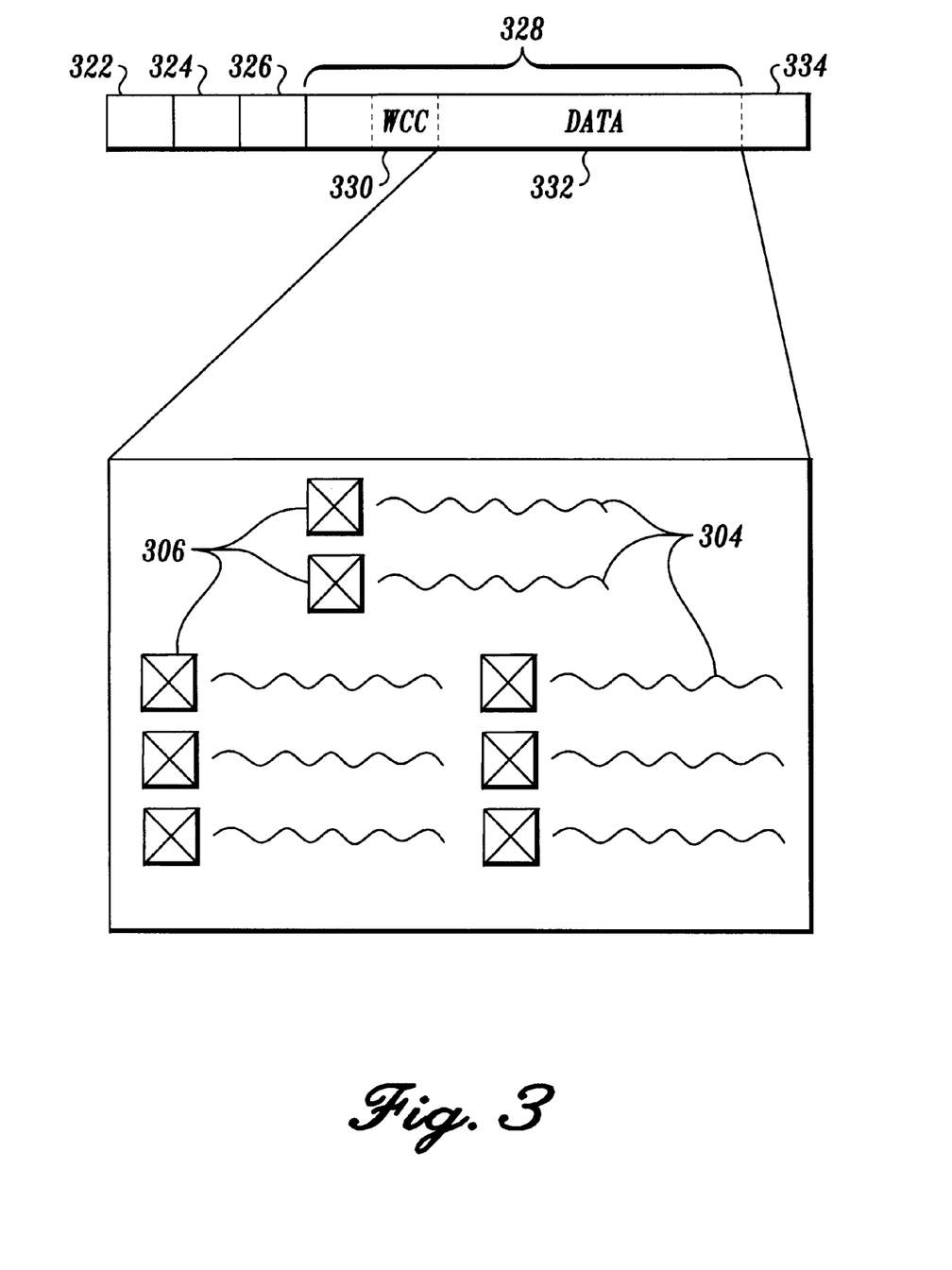
FIG. 3 is a pictorial representation of information that is received from a host computer.

FIG. 3 illustrates a data stream transmitted from an application program on a host computer to a client computer. A data link header 322 and two SNA headers provide network and application program information to the client computer. The SNA headers are a transmission header 324 and a request/response header 326. The format and details of the headers are well documented and need not be explained further here. A PS data stream 328 follows the header information, the PS data stream including a Write Control Character (WCC) byte 330 and data 332. The WCC byte includes a keyboard restore bit, as explained in further detail below.

Some host computers, in particular IBM mainframes and AS/400 computers, have field-formatted PS buffers, and transmit corresponding PS data streams. An example of a field-formatted PS data stream's contents is illustrated in FIG. 3. In a field-formatted PS data stream 208, each field 304 has a corresponding field attributes descriptor 306 that identifies particular characteristics of the associated field. The field attributes descriptor contains information such as whether the field is protected or unprotected, the type of data (i.e., string or numeric) contained within the field, the starting and ending rows and columns of the field, as well as other attributes. In FIG. 3, the field attributes descriptors 306 are identified by the [X] symbol, though on an actual screen display, the field attributes descriptors are not visible. When the host computer sends a PS data stream to a client computer, the field attributes descriptors 306 are included in the PS data stream immediately prior to the data contained within the associated field 304.

In the presently preferred embodiment of the invention, the Display control is created using ActiveX™ object technology. In order to better understand the invention, certain aspects of ActiveX object technology are first described.

ActiveX technology focuses on the use of small, reusable components called objects, within an object-oriented paradigm. ActiveX is a set of standards, developed by Microsoft, that defines the way that these objects fit together. Objects represent computer system elements, and contain program code in the form of "methods" and data. Objects can be organized into classes in a hierarchical fashion and are interoperable. Classes are abstract generic descriptions of objects and their behaviors. A class serves as a template to define the behavior of an object that is created, or "instantiated" from the class. An object, or instance of a class, is a specific individual entity, with its behaviors defined by its class. Many objects can be instantiated from a single class.

Figure 4:
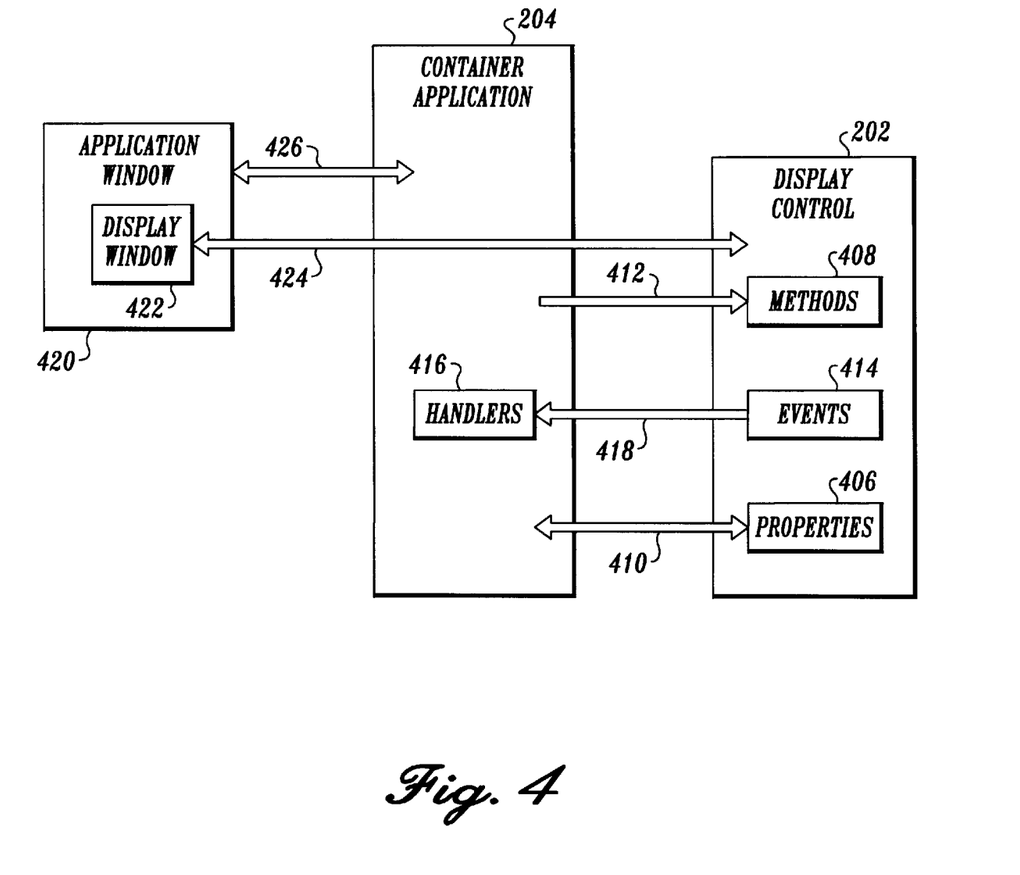
FIG. 4 is a block diagram illustrating an object architecture in accordance with the present invention.

FIG. 4 illustrates, in further detail, the Display control 202 as it is utilized within the present invention. The Display control 202 is an ActiveX object or component that is used by a "container" application 204. A container can be an application program, another ActiveX control, or another type of object. For purposes of illustration, the container depicted in FIG. 4, represents an application program and is referred to as a container application. The Display control 202 has associated with it a number of properties 406 and methods 408. A property 406 is essentially a characteristic of the ActiveX control 202, and is usually represented by data stored within the control 202. As indicated by the two-directional communication link 410 that extends between the container application 204 and the Display control 202, a property is accessible from the container application 204, and is modifiable by the container application 204.

The Display control 202 also includes one or more methods 408, which are actions taken by the Display control in response to invocations or calls by the container as represented by the communication link 412, extending between the control 202 and the container application 204. The methods 408 can utilize one or more parameters that are passed from the container to the Display control during a method invocation.

The Display control 202 may also include a set of events 414. An event is an action that is recognized by the Display control. An event is sent from the Display control to the container application 204 via a communication link 418, thereby allowing an event handler 416 within the container application 204 to perform an action. In addition, an event 414, when involving an event handler 416, may optionally pass one or more parameters to the event handler in a manner similar to parameter passing during a method invocation or function call. Events 414 and methods 408 are complementary. A method 408 is an action taken within the Display control 202 in response to an invocation from outside the control. An event 414 is initiated within the control 202 and allows an event handler 416 in the container application 204 to perform an action.

As depicted in FIG. 4, the container application 204 has an associated application window 420 that is created using a graphical operating system, such as Microsoft Windows 3.1®, Windows 95®, or Windows NT®. The container application 204 manages the application window 420, as indicated by a communication link 426. The Display control 202 has its own associated window 422 that is displayed within the application window 420. The Display control 202 manages a user interface that is created within the window 422, as indicated by a communication link 424 between the control 202 and the window 422. Management of a user interface within a graphical operating system is well understood by those skilled in the art and need not be explained further here.

The Display control's window 422 displays the presentation space data stream received from the remotely located host computer. As discussed above, a client computer receives a PS data stream representing a field-formatted screen containing fields 304 from a host computer. Each field within the PS data stream has a corresponding field attributes descriptor that identifies particular characteristics of the associated field. In accordance with the invention, the Display control 202 parses a PS data stream to delineate each individual field 304 and each corresponding field attributes descriptor 306. The parsing is performed by scanning each row of the PS data stream from top to bottom. A field attribute descriptor found during the scanning process indicates a new field. As further discussed below, the information obtained by parsing the PS data stream is converted into a hierarchical object structure as discussed in further detail below.

The Display control 202 as depicted is an embeddable object and is embedded within the container application 204.

An embeddable object is an object that can be instantiated from its class and placed within another object. Placement of an embeddable object within an object does not necessarily create a copy of the embeddable object's code, but rather places a copy of the object's data and a reference to the embeddable object's code within the container object. The reference to the embeddable object's code allows the container object to invoke the methods of the embeddable object. As depicted in FIG. 4, the container application 204 invokes methods 408 of the Display control 202.

As will be appreciated from the above discussion, a description of the Display control's properties 406, methods 408, and events 414 defines the interface between the control 202 and other objects and, in particular, the control's associated container application 204.

Figure 5:
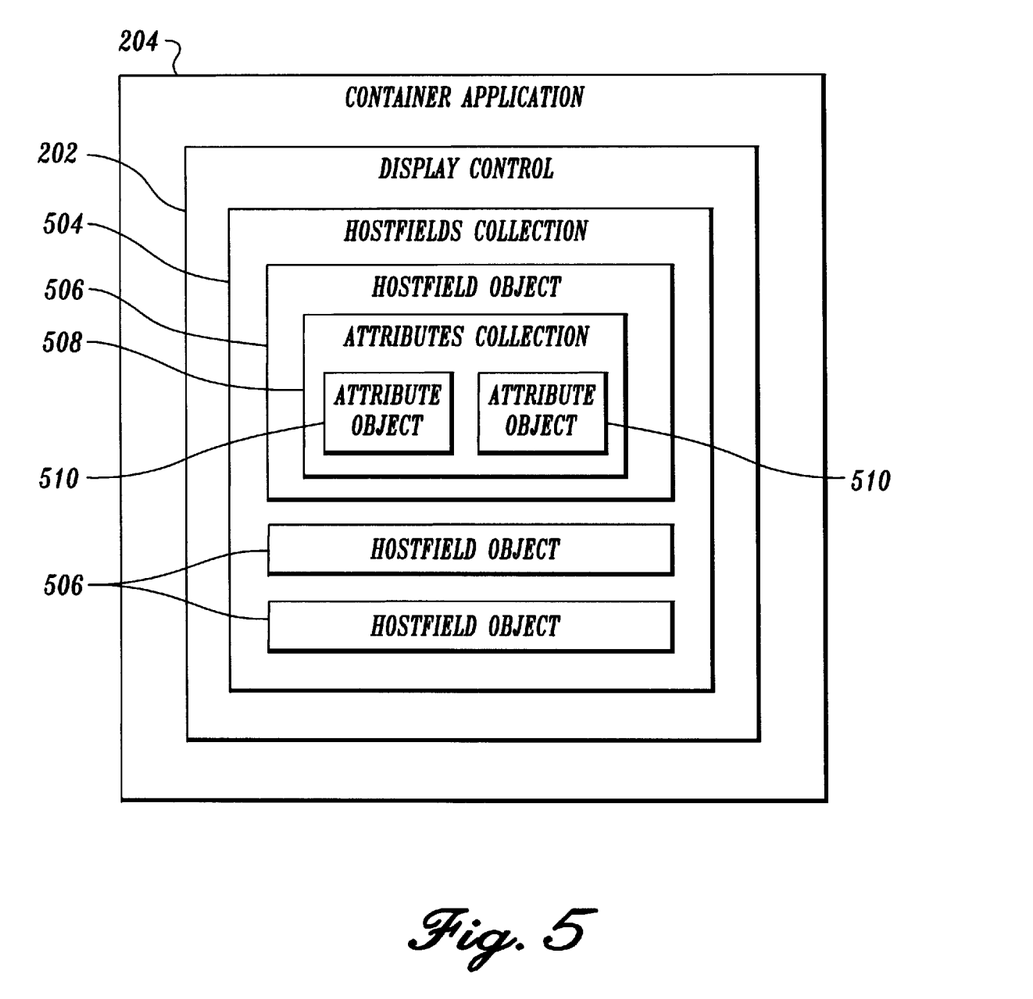
FIG. 5 illustrates the hierarchy of objects in accordance with the invention.

FIG. 5 illustrates the hierarchical object structure of the present invention. At the top of the hierarchy is the container application program 204. Included within the application program is a Display control 202, which is an imbedded ActiveX control. The Display control 202 includes a Host-Fields collection object 504. A collection is a group of objects that is itself an object. The HostFields collection object 504 is a collection of one within the HostFields collection 504.

A HostField object 506 corresponds to a particular field that is included within a PS data stream. A Display control, upon receiving a new PS data stream corresponding to a PS buffer on the host computer, parses the PS data stream to identify each field. A new HostField object 506 is instantiated for each field found in the PS data stream. The index value corresponding to a HostField object identifies the order in which the corresponding field 304 was found during scanning of the PS data stream.

In a presently preferred embodiment of the invention, the hierarchical structure is maintained by the use of references. For example, a Display control 202 includes a reference to the HostFields collection object 504 that is included within the Display control. It is not necessary that the data or code that comprises the HostFields collection object 504 be located in memory within the data or code that comprises the Display control. As will be apparent to one skilled in this art, and others, alternate means are available for implementing a hierarchical structure such as that described above.

Figure 6A:
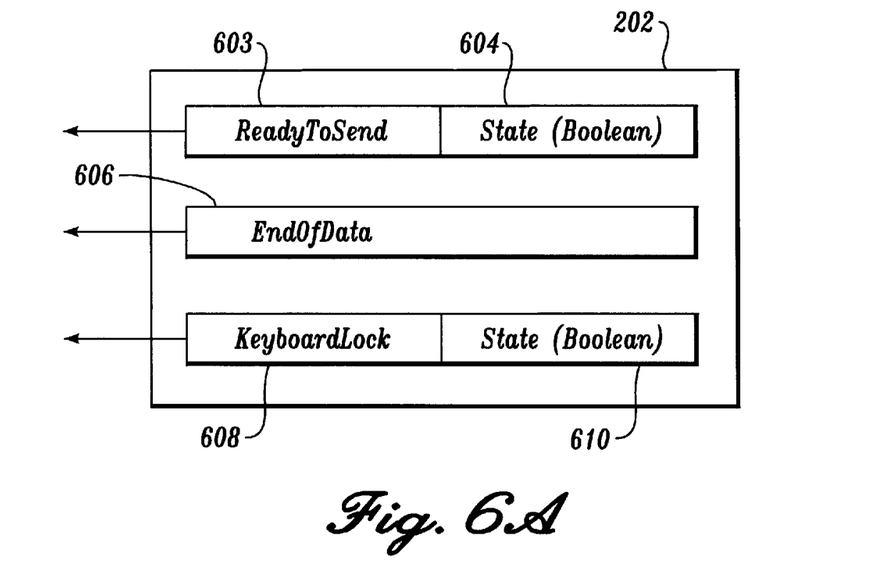
FIGS. 6A and 6B illustrate subsets of events provided by a Display control in accordance with the present invention.
Figure 7A:
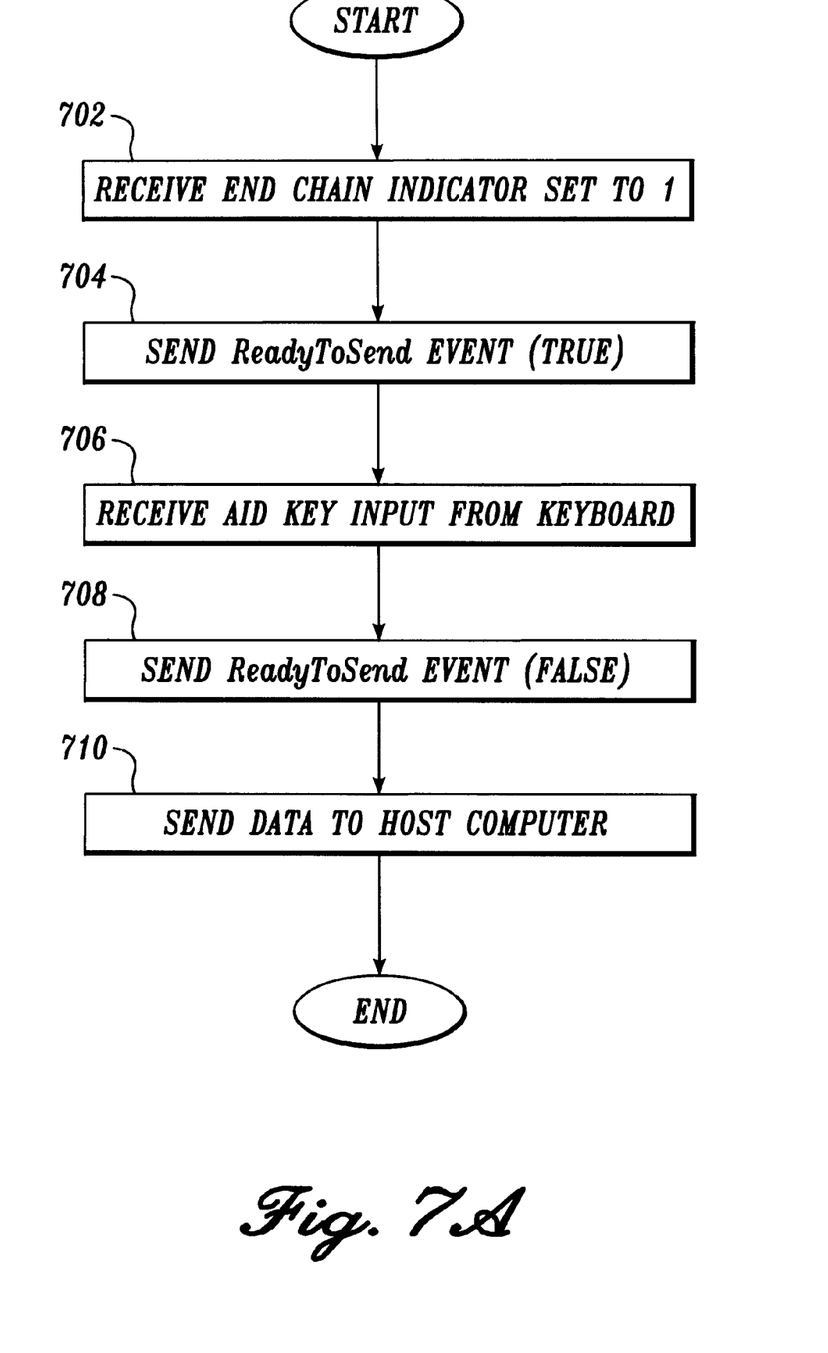
FIGS. 7A and 7B are flow diagrams illustrating the steps performed by the present invention to send events to an application program.

FIG. 6A illustrates a subset of the events that exist within a Display control 202 in accordance with the present invention. The events illustrated in FIG. 6A are related to the sending and receiving of data between the Display control, the host computer, and a keyboard. A ReadyToSend event 603 indicates whether the network is in a state that enables a client computer to send data to the host computer. The ReadyToSend event 603 includes a "State" parameter 604, which is a Boolean value set to TRUE if sending data to the host is enabled, and set to FALSE if sending data to the host is disabled. A ReadyToSend event 603 with a State parameter 604 of TRUE is triggered by an "End of Chain" indicator set to a value of 1. The End of Chain indicator is within an SNA request/response header. A ReadyToSend event 603 with a State parameter of FALSE is triggered when the Display control is preparing to send data to the host computer. Data is sent to the host computer when the Display control receives a signal that an Attention Identifier (AID) key has been pressed on the client computer keyboard. An AID key is one of a set of keys defined by the host computer 104. The set of keys indicating an Attention Identifier typically includes the Enter key and Function keys. The occurrence of the ReadyToSend event 603 allows an application program to manipulate the data or otherwise effect the transfer of data prior to the data being sent to the host. FIG. 7A illustrates the process utilized by the Display control 202 to send a ReadyToSend event 603 to the container application program 204. At a step 702, the Display control receives an SNA request/response header having an "End of Chain" indicator set to 1. In response, the Display control sends a ReadyToSend event with a State parameter of TRUE to the container application at a step 704. At a step 706, the Display control receives input from the keyboard, the input being terminated by an Attention Identifier key. At a step 708, the Display control sends a ReadyToSend event with a State parameter of FALSE to the container application program 204. Finally, at a step 710, the Display control sends the data input from the keyboard to the host computer Returning now to FIG. 6A, the EndOfData event 606 occurs when a transmission of data from the host computer is completed. The event is triggered by a "Change Direction" indicator within an SNA request/response header set to a value of 1, which is itself an indication that the direction of transmission between the host and the client computer is reversed. The EndOfData event 606 includes no parameters.

The KeyboardLock event 608 occurs when the keyboard state transitions between locked and unlocked. The Display control manages locking and unlocking of the keyboard on the client computer. When the keyboard is locked, input by an operator is ignored. The Display control determines whether to lock or unlock the keyboard based on input received from the host computer or the keyboard. The KeyboardLock event indicates whether the keyboard on the client computer is locked. The KeyboardLock event 608 includes a "State" parameter 610, which is a Boolean value set to TRUE if the keyboard is locked, and FALSE if it is released. A Display control 202 triggers a KeyboardLock event 608 when the Display control from the host computer 104. A keyboard restore bit is a single bit within the WCC byte. When the Display control receives a WCC with the keyboard restore bit set to one, a KeyboardLock event 608 with a State parameter of FALSE is triggered. When the Display control receives a WCC byte with the keyboard restore bit set to zero, a KeyboardLock event 608 with a State parameter of TRUE is triggered. A KeyboardLock event 608 with a State parameter of TRUE is also triggered when the Display control 202 receives a signal indicating that an Attention Identifier (AID) key selection has been made on the client computer. A KeyboardLock event 608 with a State parameter of TRUE notifies the container application program that application input is disabled, thereby providing the host computer 104 time to process the input. When a KeyboardLock event is triggered by an AID key, a ReadyToSend event 603 having a State parameter of FALSE is preferably triggered subsequent to a KeyboardLock event 608 having a State parameter of TRUE.

Figure 7B:
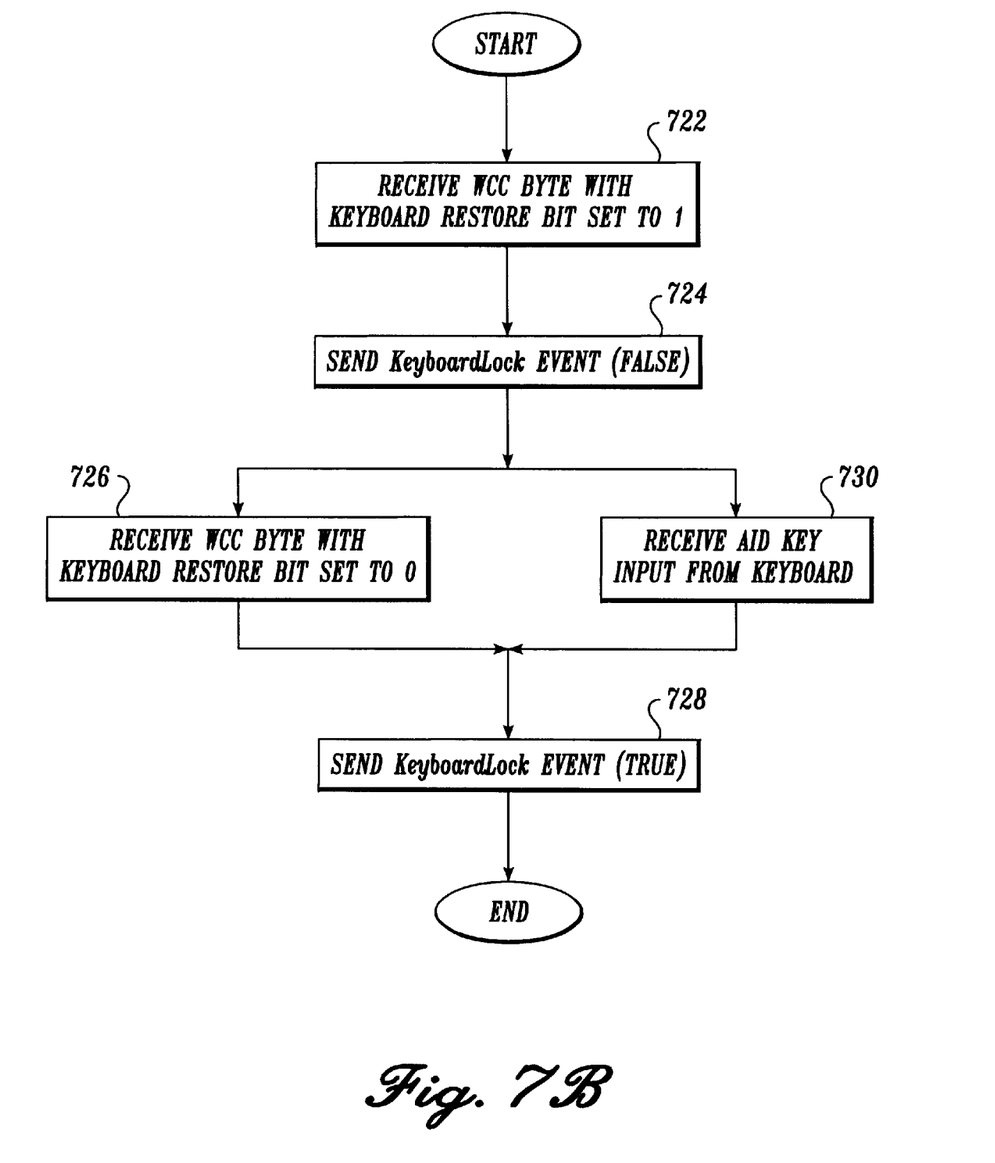

FIG. 7B illustrates the process utilized by the Display control 202 to send a KeyboardLock event 608 to the container application program 204. At a step 722, the Display control receives a data stream having a WCC byte with the keyboard restore bit set to one. In response, the Display control sends a KeyboardLock event with a State parameter of FALSE to the container application program at a step 724. At a step 726, the Display control receives a data stream having a WCC byte with the keyboard restore bit set to zero. At a step 728, the Display control sends a KeyboardLock event with a State parameter of TRUE to the container application program 204. Alternatively, the Display control may receive an AID key selection as input from the client keyboard, at a step 730, instead of receiving the keyboard restore bit set to zero at the step 726. Following the receipt of the AID key selection from the client keyboard at the step 730, the Display control sends a KeyboardLock event with a State parameter of TRUE, at the step 728, to the container application program 204.

Figure 6B:
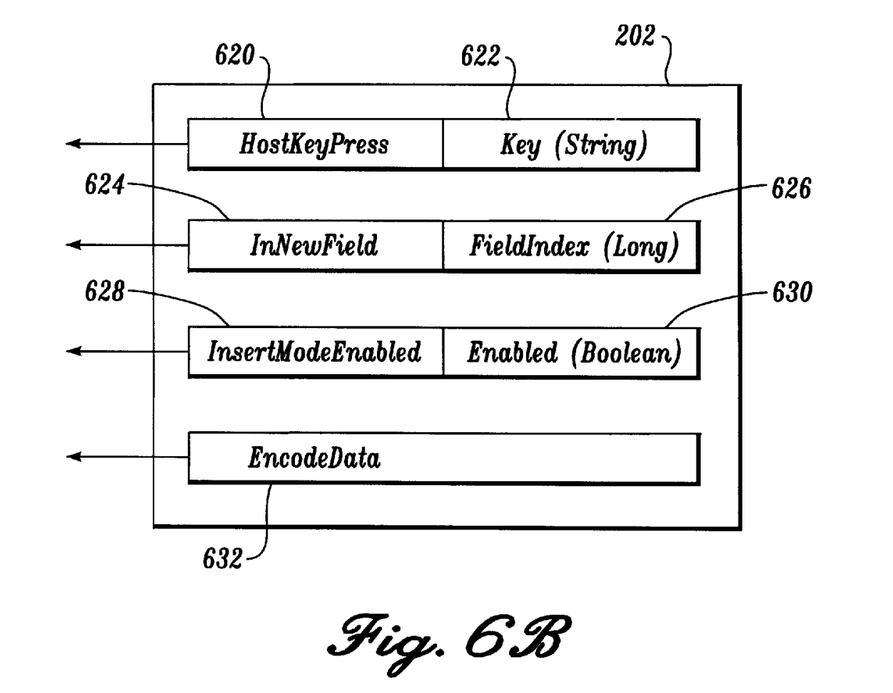

FIG. 6B illustrates a subset of the Display control 202 events pertaining to notifications of operator input. The HostKeyPress event 620 occurs when an operator of the client computer selects a key or releases the Shift, Control, or Alt modifier keys. The HostKeyPress event 620 has a Key parameter 622, passed as a string, which specifies the key, or key combination, pressed by the operator. The keys are mapped from the client keyboard to the host computer keyboard. Specifically, some keys or key combinations are mapped into keyboard mnemonics. A keyboard mnemonic is a string of two or more ANSI characters that represent a key or key combination. For example, if an operator enters a TAB on the client keyboard, the Display Control 202 will send a HostKeyPress event 620 with the string in the Key parameter 622 set to @T, which is the mnemonic equivalent of TAB. An event handler within the container application 204 that receives a HostKeyPress event 620 can prevent the Display control 202 from processing the input key by changing the string in the Key parameter 622 to an empty string. This allows the container application to filter out undesired key combinations.

The set of keys to be mapped and their mnemonic equivalents are defined by the host computer application to which the Display Control is communicating. The table below includes the keys and their mnemonic equivalents that are passed in the Key parameter for IBM mainframe, AS/400, and Unix Host Computers 104. As illustrated in the table, some of the mnemonics are not recognized by all host computers. A Display control 202 determines the mnemonic to send based on the particular host computer with which the Display control communicates.

| Meaning | Mnemonic | Mainframe | AS/400 | UNIX |
| --- | --- | --- | --- | --- |
| @ | @@ | X | X | |
| Alt | @A | X | | X |
| Alt Cursor | @$ | X | X- | |
| Attention | @A@Q | X | X | |
| Backspace | @< | X | X | X |
| Backtab (Left Tab) | @B | X | X | X |
| Clear | @C | X | X | |
| Cmd (function) Key | @A@Y | | X | =Control Key |
| Cursor Down | @V | X | X | X |
| Cursor Left | @L | X | X | X |
| Cursor Right | @Z | X | X | X |
| Cursor Select | @A@j | X | | |
| Cursor Up | @U | X | X | X |
| Delete | @D | X | X | |
| Dup | @S@x | X | X | |
| End | @q | | X | |
| Enter | @E | X | X | X |
| Erase EOF | @F | X | X | |
| Erase Input | @A@F | X | X | =Remove |
| Field Exit | @A@E | | X | =Find |
| Field Mark | @S@y | X | X | =Select |
| Field − | @A@− | | X | =Previous Screen |
| Field + | @A@+ | | X | =Next Screen |
| Help | @H | | X | |
| Hexadecimal | @A@X | | X | =Compose |
| Home | @0 (zero) | X | X | |
| Insert | @I | X | X | X |
| Insert Toggle | @A@I | | X | |
| Local Print | @P | | X | |

-continued

| Meaning | Mnemonic | Mainframe | AS/400 | UNIX |
| --- | --- | --- | --- | --- |
| Left Tab (Back Tab) | @B | X | X | X |
| New Line | @N | | | X |
| Page Up | @u | | X | |
| Page Down | @v | | X | |
| Print (PC) | @A@t | @P | X | |
| Print Screen | @A@T | X | | |
| Record Backspace | @A@< | | X | |
| Reset | @R | X | X | |
| Right Tab (Tab) | @T | X | X | X |
| Shift | @S | X | | X |
| Sys Request | @A@H | X | X | |
| Tab (Right Tab) | @T | X | X | X |
| Test | @A@C | | X | |
| PA1 | @x | X | | =PF1 |
| PA2 | @y | X | | =PF2 |
| PA3 | @z | X | | =PF3 |
| PA4 | @+ | X | | =PF4 |
| PA5 | @% | X | | |
| PA6 | @& | X | | |
| PA7 | @' | X | | |
| PA8 | @( | X | | |
| PA9 | @) | X | | |
| PA10 | @* | X | | |
| PF1/F1 | @1 | X | X | =F1 |
| PF2/F2 | @2 | X | X | =F2 |
| PF3/F3 | @3 | X | X | =F3 |
| PF4/F4 | @4 | X | X | =F4 |
| PF5/F5 | @5 | X | X | =F5 |
| PF6/F6 | @6 | X | X | =F6 |
| PF7/F7 | @7 | X | X | =F7 |
| PF8/F8 | @8 | X | X | =F8 |
| PF9/F9 | @9 | X | X | =F9 |
| PF10/F10 | @a | X | X | =F10 |
| PF11/F11 | @b | X | X | =F11 |
| PF12/F12 | @c | X | X | =F12 |
| PF13/F13 | @d | X | X | =F13 |
| PF14/F14 | @e | X | X | =F14 |
| PF15/F15 | @f | X | X | =F15 |
| PF16/F16 | @g | X | X | =F16 |
| PF17/F17 | @h | X | X | =F17 |
| PF18/F18 | @i | X | X | =F18 |
| PF19/F19 | @j | X | X | =F19 |
| PF20/F20 | @k | X | X | =F20 |
| PF21/F21 | @l | X | X | |
| PF22/F22 | @m | X | X | |
| PF23/F23 | @n | X | X | |
| PF24/F24 | @o | X | X | |

Again referring to FIG. 6B, the InNewField event 624 occurs when the cursor is positioned within a new field of the Display control's display window. This provides the container application 204 with an indication that an operator has moved from one field to another, thereby allowing the application 204 to perform operations pertaining to either the previous field or the new field. As illustrated in FIG. 3, a PS data stream sent from a host computer includes one or more fields. When the Display control 202 receives a PS data stream 208 from a host computer 104, the Display control extracts each field, and organizes the fields into a collection of fields. Each field has a corresponding index number that is unique in the PS data stream The InNewField event 624 includes a FieldIndex parameter 626 that is passed as a numeric long value. The FieldIndex parameter 626 contains the index position of the new field within the field's collection. Preferably, the index position ranges between zero and one less than the number of fields within the PS data stream.

The InsertModeEnabled event 628 occurs when the Display control 202 receives a signal indicating that the "Insert" key on the keyboard of the client computer has been pressed to toggle between insert and overstrike mode. The Enabled parameter 630 is a Boolean value that is set to TRUE when the keyboard is computer has been pressed to toggle between insert and overstrike mode. The Enabled parameter 630 is a Boolean value that is set to TRUE when the keyboard is changed to insert mode, and set to FALSE when the keyboard is set to overstrike mode.

The EncodeData event 632 occurs before encoding an outgoing data stream. Sending any text or key to the host computer causes an EncodeData event 632 to occur. The EncodeData event 632 has no parameters.

The combination of events pertaining to user input notification (HostKeyPress 620, InNewField 624, InsertModeEnabled 628, and EncodeData 632) allows an application program to easily monitor an operator's activities at a client computer keyboard, and to take appropriate actions.

In addition to sending events to an application program, the Display control of the present invention provides a set of properties that characterize data received from a host computer. In order to better understand the preferred method of providing properties to an application program, a brief description of the information that a host computer sends to a client computer is first described.

Figure 8:
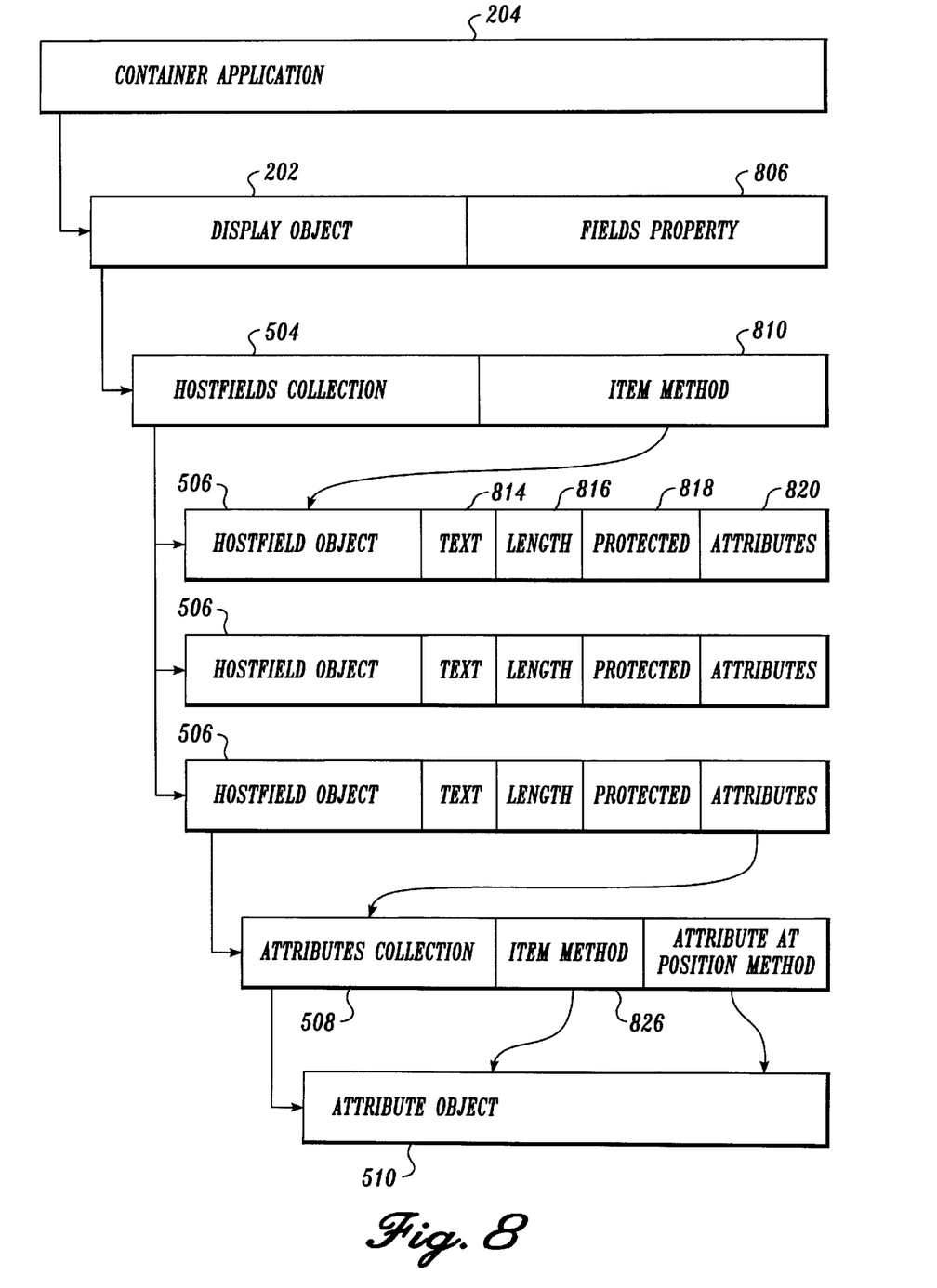
FIG. 8 illustrates the hierarchy of objects and properties or methods that reference the objects in accordance with the invention.

FIG. 8 illustrates the properties and methods that support the hierarchical object structure of the present invention. The hierarchical object structure was described above with reference to FIG. 5. At the top of the hierarchy is the container application program 204. The application program includes a Display control 202, which is an imbedded ActiveX control. A Display control 202 includes a Fields property 806 that holds a pointer to a HostFields collection 504. The HostFields collection object 504 includes an Item method 810 that takes an index value as a parameter, and returns a pointer to a HostField object 506 corresponding to the index value.

A HostField object 506 corresponds to a field 304 within a PS data stream 208. As discussed above, a new HostField object 506 is instantiated for each field found in the PS data stream received from the host computer. The index value corresponding to a HostField object identifies the order in which the corresponding field was found during scanning of the PS data stream. A HostField object 506 includes multiple properties, each property describing a particular characteristic of the HostField object. In particular, the HostField object includes the following properties:

| Property Name | Explanation |
|---|---|
| Attributes | Contains a reference to an attributes collection object for the field. |
| AutoEnter | Contains a value that indicates whether the field has the AutoEnter attribute. A field with the AutoEnter attribute sends the entire contents of the field to the host computer when the operator enters the last character or when a field exit key is pressed. |
| Dup | Returns a value that indicates whether this field has the Dup attribute. A field with the Dup attribute repeats hex 1C character from the cursor position to the end of the field when the operator selects the Dup key. This appears on the display as an overstruck asterisk. |
| EndColumn | Contains a value that indicates the ending column of the field. |
| EndRow | Contains a value that indicates the ending row of a field. |
| FieldExitRequired | Contains a value that indicates whether the field has the Field Exit attribute. A field with the Field Exit attribute requires an operator to exit the field with a nondata key. After the last character is entered, the cursor remains under the last character typed until a Field Exit key is pressed. |
| Hidden | Contains a value that indicates whether the field is hidden (not displayed). |
| Justify | Contains a value that indicates how the text in the field is justified. Possible values are: Not justified; right justified with zero fill; right justified with blank fill; or mandatory fill. |
| Length | Contains a value that indicates the field length. |
| MandatoryEnter | Contains a value that indicates whether the field has the Mandatory Enter attribute. This attribute requires the operator to enter something in the field before the Enter key is active. An error occurs if the operator tries to exit using a Field Exit key. |
| ModifiedDataTag | Contains a value that indicates if the field has the Modified Data Tag attribute. If the field has the Modified Data Tag attribute, the field is marked as having been modified by the operator. |
| Protected | Contains a value that indicates if the field has the Protected attribute, indicating that it cannot accept input. |
| StartColumn | Contains a value that indicates the starting column of the field in character units. |
| StartPosition | Contains a value that indicates the starting position of the field within the presentation space. |
| StartRow | Contains a value that indicates the starting row of the field in character units. |
| Text | Contains the text that appears within the field. |
| TranslateLowerToUpper | Contains a value that indicates whether characters entered in lower case are displayed in upper case. |
| Type | Contains a value that indicates the field type. This property contains a value indicating one of the following field types: Any character; alphabetic characters only; alphanumeric characters only; upper case characters only; numeric characters only; digits only; signed numeric characters only; implied decimal; numeric shift; or Katakana shift. |

With reference now to FIGS. 4 and 8, the relationship between objects and the user interface is now described. The container application 204 controls the application window 420. The Display control 202 controls the Display window 422. The HostFields collection 504 has no visible manifestation, and is used to contain and organize the HostField objects 506. Each HostField object 506 represents a field 304 received from the host computer PS data stream. Although some fields may be invisible, most fields are visible within the Display window 422. The field attributes descriptor 306 received from the host computer and corresponding to a field 304 (FIG. 3) is translated into properties of a corresponding HostFields collection object 506. FIG. 8 illustrates the "Text" property 814, the "Length" property 816, and the "Protected" property 818. As discussed above, the Text property 814 contains the text of the corresponding field 304 and the Length property 816 contains the length of the field 304. The value of the Length property is not directly specified in the PS data stream, but is determined by the Display control based on the length of the field. The Protected property 818 contains the value "TRUE" if the field is a read-only protected field and cannot be changed by an operator and, correspondingly, the value FALSE if the field is unprotected.

An application program can access any property within a HostField object. For example, in Visual Basic, the following statement can be used to print the text within a field object:

Print Display.Fields.Item[1].Text

The following table describes the action that each method takes or the data that each property provides in the above Visual Basic statement:

| Item | Action |
| --- | --- |
| Display | Specifies the Display control. |
| Fields | The Display control's "Fields" property returns a pointer to a HostFields collection object. |
| Item[1] | The HostFields collection "item" method returns a pointer to the second Fields object within the HostFields collection. |
| Text | The "Text" property of the second Fields object returns the text that appears in the field. |

The variable name Display 602 contains a value that is a reference to a Display control 202. The Display control 202 has a Fields property 806 contained within it. The Fields property 806 has a value that is a pointer to a HostFields collection object 504. The HostFields collection object 504 includes an Item method that retrieves a HostField object by its position. The Item method, when passed a numeric index value, returns a pointer to a HostField object 506. Item[1] returns a pointer to the second HostField object 506. The reference to "Text" returns the string contained within the Text property 814 of the HostField object 506.

Since a visual basic application accesses object properties directly, via a property list, visual basic references to properties access properties as data, as illustrated above. However, a visual C++ application accesses the properties indirectly, by calls to property access functions supported by the objects. Thus, a preferred visual C++ syntax for each property includes "get" and "put" functions for the container application to call. For example, the syntax for getting the Text property from a HostField object and modifying the Text property of a HostField object is as follows:

```
HRESULT<object>.get_Text(BSTR*Value);
HRESULT<object>.put_Text(BSTR Value);
```

The following sequence of statements written in the visual C++ language performs the same sequence of operations as the visual basic statement illustrated above:

```
LPUNKNOWN IUnknown=GetControlUnknown( );
LPDISPATCH IDisplay;
IUknown->QueryInterface(IID_IDispatch, (LPVOID*)
   & IDisplay);
LPDISPATCH IFields=IDisplay->get_Fields( );
LPDISPATCH IField=IFields->Item(1);
BSTR Text=IField->get_Text( );
```

The HostField object 506 also includes an "Attributes" property, which holds a reference to an Attributes collection object 508. The Attributes collection object contains a collection of Attribute objects 510, each Attribute object corresponding to one character within a field. An Attribute object 510 can be accessed through an Item method 826 or an AttributeAtPosition method 828 within the Attributes collection object 508. The Item method 826 takes an index number as a parameter, and retrieves an Attribute object 510 by its position. The AttributeAtPosition method 828 takes a row parameter and a column parameter, and returns an Attribute object 510 positioned at the specified row and column coordinates.

A Display control as described above provides an application programmer with the ability to create a container application program having a window that displays information from a host computer PS data stream. The application program can interact with the Display control using conventional object-oriented techniques, thereby reducing complexity and increasing efficiency of the application program. By providing useful data to the application program, utilizing both synchronous and asynchronous communication, the Display control assists an application programmer in the development of a desirable application program. This reduces application programming time and improves the quality of an application program.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of controlling the transmission of information between a host computer and a remotely located client computer, comprising:

providing a Display control contained in an application and receiving information from the host computer;

receiving, at the Display control, a data stream that is transmitted from the host computer, a portion of the data stream indicating the host computer being in a state of ready to receive data;

upon receipt of the portion of the data stream indicating the host computer being in a state of ready to receive data, sending a first ReadyToSend event to an event handler in the application program, the first ReadyToSend event including a State parameter set to TRUE that indicates the host computer is ready to receive data;

receiving, at the Display control, input data from the client computer;

sending a second ReadyToSend event to the event handler in the application program, the second ReadyToSend event having a State parameter set to FALSE that indicates the host computer is not ready to receive data from the client computer; and sending the input data from the Display control to the host computer.

2. The method of claim 1, wherein the host data that is transmitted from the host computer includes an SNA header containing an End Chain indicator that indicates the host computer is ready to receive data.

3. The method of claim 1, further comprising:

receiving, at the Display control, keyboard lock data that is transmitted from the host computer, the keyboard lock data indicating a condition that triggers unlocking of a keyboard of the client computer;

upon receipt of the keyboard lock data, sending a first KeyboardLock event to the application program, the first KeyboardLock event having a State parameter set to FALSE that indicates the keyboard of the client computer is unlocked;

receiving a signal at the Display control that indicates a condition that triggers locking of the keyboard; and upon receipt of the signal, sending a second KeyboardLock event to the application program, the first KeyboardLock event having a State parameter set to TRUE that indicates the keyboard of the client computer is locked.

4. The method of claim 3, wherein the keyboard lock data that is transmitted from the host computer includes a write control character byte containing a keyboard restore bit that indicates a condition that triggers unlocking of the keyboard.

5. The method of claim 4, wherein the signal comprises a second write control character byte received from the host computer, the second write control character byte containing a keyboard restore bit indicating a condition that triggers locking of the keyboard.

6. The method of claim 3, wherein the signal indicates an Attention Identifier key has been pressed on the keyboard of the client computer.

7. The method of claim 6, further comprising:
receiving at the Display control a key selection signal indicative of at least one key selection from the keyboard of the client computer; and
upon receipt of the key selection signal indicative of at least one key selection, sending a HostKeyPress event to the application program, the HostKeyPress event including a Key parameter containing at least one character representative of the key selection.

8. The method of claim 7, further comprising:
translating the key selection into a string of at least two characters, the string including a mnemonic representation of the key selection.

9. The method of claim 8, further comprising upon receipt of the key selection signal indicative of at least one key selection, sending an EncodeData event to the application program, wherein the sending of the EncodeData event is performed prior to the sending of the input data.

10. The method of claim 6, further comprising:
receiving at the Display control a field movement signal indicative of the operator moving from a first field to a second field; and
upon receipt of the field movement signal, sending an InNewField event to the application program, the InNewField event including a FieldIndex parameter representative of an index value corresponding to the second field.

11. The method of claim 6, further comprising:
receiving at the Display control an insert signal indicative of a selection of an Insert key from the keyboard of the client computer, and
upon receipt of the insert signal, sending an InsertModeEnabled event to the application program, the InsertModeEnabled event including an Enabled parameter that is set to TRUE when the keyboard is in insert mode.

12. A method of providing information from a host computer to an application program running on a remotely located client computer, the method comprising:
providing a Display control and an associated collection object contained in the application program;
receiving, at the Display control, a presentation space data stream from the host computer, the presentation space data stream including a plurality of information fields;
scanning the presentation space data stream to locate each of the information fields;
creating a plurality of field objects, each of which has a corresponding information field and an associated unique index value;
storing in each field object a plurality of properties pertaining to its corresponding information field in the presentation space data stream, the properties including:
text obtained from the corresponding information field; and
the length of the corresponding information field;
storing, in the collection object, a reference to at least one of the field objects;
receiving, at the Display control, a request from the application program, via methods provided by the Display control, for a reference to the collection object;
receiving, at the Display control, a request from the application program, via methods provided by the Display control, for a reference to one of the plurality of field objects, the request including an index value indicative of the requested one of the plurality of field objects;
receiving, at the Display control, a request from the application program, via methods provided by the Display control, for the text stored in the requested one of the field objects;
returning, from the Display control to the application program, a string containing the text stored in the requested field object;
receiving, at the Display control, a request from the application program, via methods provided by the Display control, for the length of the information field corresponding to the requested field object; and
returning from the Display control to the application program, a valve indicative of the length of the information field corresponding to the requested field object.

13. The method of claim 12, wherein the properties stored in each field object further include a protected property that indicates whether the host computer permits changes to the field from the client computer.

14. A method for accessing information on a host computer from remotely located client computers, the method comprising:
providing a Display control within a container running on one of the plurality of client computers for communicating with the host computer;
transmitting a data stream from the host computer, the data stream comprising field information and a ready indicator representing the host computer is ready to receive data, the field information comprising a plurality of fields each having an associated field descriptor;
receiving the data stream at the Display control;
parsing the data stream by the Display control, and upon parsing any of the field information, converting the field information into a hierarchical object structure;
displaying the field information in a display control window on the client computer;
modifying the field information displayed in the display control window by invoking a method of one of a plurality of objects in the hierarchical object structure for the Display control;
upon receiving a predetermined key entry from the client application, the Display control transmitting the modified field information to the host computer.

15. The method of claim 14, wherein converting the field information into a hierarchical object structure comprises:
creating a plurality of field objects for each field; and
storing in each field object a plurality of properties that correspond to the associated field descriptor.

16. The method of claim 15, wherein converting the field information into a hierarchical object structure further comprises:
creating a collection object with a reference to at least one of the field objects.

17. The method of claim 16, wherein the reference comprises an index representing a relative order for the field object determined during parsing of the data stream.

18. The method of claim 14, wherein the container comprises an application running on the client computer.

* * * * *